US012780251B2

(12) United States Patent
Jo et al.

(10) Patent No.: US 12,780,251 B2
(45) Date of Patent: Nov. 3, 2026

(54) VEHICLE CONTROL METHOD AND DEVICE

(71) Applicant: HL KLEMOVE CORP., Incheon (KR)

(72) Inventors: Eun San Jo, Incheon (KR); Da-Yeon Seo, Incheon (KR); Han Shin Cho, Incheon (KR); Dai Chang Ro, Incheon (KR); Seung Mok Song, Incheon (KR); Jun-Hyung Cha, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 161 days.

(21) Appl. No.: 18/792,507

(22) Filed: Aug. 1, 2024

(65) Prior Publication Data

US 2025/0187629 A1 Jun. 12, 2025

(30) Foreign Application Priority Data

Dec. 11, 2023 (KR) ........................ 10-2023-0178531

(51) Int. Cl.
*B60W 60/00* (2020.01)
*B60W 40/10* (2012.01)

(52) U.S. Cl.
CPC ........ *B60W 60/0011* (2020.02); *B60W 40/10* (2013.01); *B60W 2554/802* (2020.02); *B60W 2556/45* (2020.02)

(58) Field of Classification Search
CPC ............. B60W 60/0011; B60W 40/10; B60W 2554/802; B60W 2556/45; B60W 40/02;
(Continued)

(56) References Cited

U.S. PATENT DOCUMENTS

2014/0088855 A1* 3/2014 Ferguson ........... G01C 21/3819 701/117
2017/0269605 A1* 9/2017 Myers .................. G05D 1/0212
(Continued)

FOREIGN PATENT DOCUMENTS

JP 2017-45356 3/2017
JP 2018-45500 3/2018
(Continued)

OTHER PUBLICATIONS

JP 2018045500 A—machine translation (annotated by Examiner) (Year: 2018).*
(Continued)

*Primary Examiner* — Dino Kujundzic
(74) *Attorney, Agent, or Firm* — WOMBLE BOND DICKINSON (US) LLP

(57) ABSTRACT

The present embodiments relate to technology for controlling the behavior of a vehicle by producing a vehicle driving path and provide a vehicle control device and method comprising a sensing information receiver receiving sensing information from a sensor configured in a vehicle, a driving path estimator estimating a driving path for each preconfigured driving path estimation algorithm according to each driving path estimation algorithm using the sensing information, a driving path evaluator evaluating a reliability of the driving path for each driving path estimation algorithm, a driving path fuser producing a fused driving path based on the driving path for each driving path estimation algorithm and the reliability information, and a control signal outputter outputting a control signal for controlling a behavior of the vehicle according to the fused driving path.

20 Claims, 10 Drawing Sheets

(58) Field of Classification Search
CPC ......... B60W 50/0097; B60W 60/0027; B60W 2554/801
See application file for complete search history.

(56) References Cited

U.S. PATENT DOCUMENTS

| | | | | |
|---|---|---|---|---|
| 2020/0223449 | A1* | 7/2020 | Tsuji | G08G 1/09626 |
| 2020/0317193 | A1* | 10/2020 | Ueda | G08G 1/16 |
| 2020/0385018 | A1* | 12/2020 | Kameoka | B60W 60/0011 |
| 2021/0094581 | A1* | 4/2021 | Lee | B60W 30/14 |
| 2021/0114617 | A1* | 4/2021 | Phillips | G01C 21/3453 |
| 2021/0155267 | A1* | 5/2021 | Goto | B60W 60/0027 |
| 2022/0032952 | A1* | 2/2022 | Lienke | B60W 60/0013 |
| 2022/0326023 | A1* | 10/2022 | Xu | B60W 60/001 |

FOREIGN PATENT DOCUMENTS

| | | |
|---|---|---|
| KR | 10-2015-0060953 | 6/2015 |
| WO | 2020/002964 | 1/2020 |

OTHER PUBLICATIONS

T. T. Nguyen et al., "Multisource Fusion for Robust Road Detection Using Online Estimated Reliabilities," in IEEE Transactions on Industrial Informatics, vol. 14, No. 11, pp. 4927-4939, Nov. 2018. (Year: 2018).*

Office Action dated Nov. 3, 2025 for Korean Patent Application No. 10-2023-0178531 and its English translation provided by Applicant's foreign counsel.

* cited by examiner

VEHICLE CONTROL METHOD AND DEVICE

CROSS-REFERENCE TO RELATED APPLICATION

This application claims priority from Korean Patent Application No. 10-2023-0178531, filed on Dec. 11, 2023, which is hereby incorporated by reference for all purposes as if fully set forth herein.

BACKGROUND

Field

The present embodiments relate to technology for controlling the behavior of a vehicle by calculating a vehicle driving path.

Description of Related Art

Recently, in the automobile industry, as the development of information and communication technology and the importance of individual leisure increase, the development of driving intelligence assistance and autonomous driving technology is attracting attention.

Here, autonomous driving refers to the technology for controlling the vehicle by recognizing the surrounding environment without intervention of the driver and determining the driving context using sensors configured in the vehicle such as light detection and ranging (LiDAR) or global positioning system (GPS). Through this, it is possible to alleviate the driver's driving burden and provide an advantage of securing a time for productivity or leisure in the vehicle.

Further, various in-vehicle driving intelligence assistance functions such as lane keeping assistance technology and vehicle follow control technology are being added and actively used. In particular, there is disclosed vehicle control technology that controls the vehicle for each function using a plurality of sensors provided to implement various functions in the vehicle.

Therefore, there is a need for research on technologies for accurately and stably providing various increasing in-vehicle functions and autonomous driving functions. In particular, when a vehicle sets a driving path such as a lane and drives without (or while minimizing) driver intervention, a technology for stably determining the driving path is required.

BRIEF SUMMARY

The present embodiments provide a vehicle control method and device for calculating a driving path of a vehicle using a plurality of estimated driving paths.

In an aspect, the present embodiments may provide a vehicle control device comprising a sensing information receiver receiving sensing information from a sensor configured in a vehicle, a driving path estimator estimating a driving path for each preconfigured driving path estimation algorithm according to each driving path estimation algorithm using the sensing information, a driving path evaluator evaluating a reliability of the driving path for each driving path estimation algorithm, a driving path fuser producing a fused driving path based on the driving path for each driving path estimation algorithm and the reliability information, a defect detector determining whether a defect occurs by comparing the fused driving path with the driving path for each driving path estimation algorithm, and a control signal outputter outputting a control signal for controlling a behavior of the vehicle according to a final fused driving path reproduced based on a result of determining whether the defect occurs.

In another aspect, the present embodiments may provide a vehicle control method comprising receiving a sensing information from a sensor configured in a vehicle; estimating a driving path for each driving path estimation algorithm according to each preconfigured driving path estimation algorithm using the sensing information; evaluating a reliability of the driving path for each driving path estimation algorithm; producing a fused driving path based on the driving path for each driving path estimation algorithm and the reliability information; determining whether a defect occurs by comparing the fused driving path with the driving path for each driving path estimation algorithm; and outputting a control signal for controlling a behavior of the vehicle according to a final fused driving path reproduced based on a result of determining whether the defect occurs.

The present embodiments may provide a vehicle control method and device for calculating a driving path of a vehicle using a plurality of estimated driving paths.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
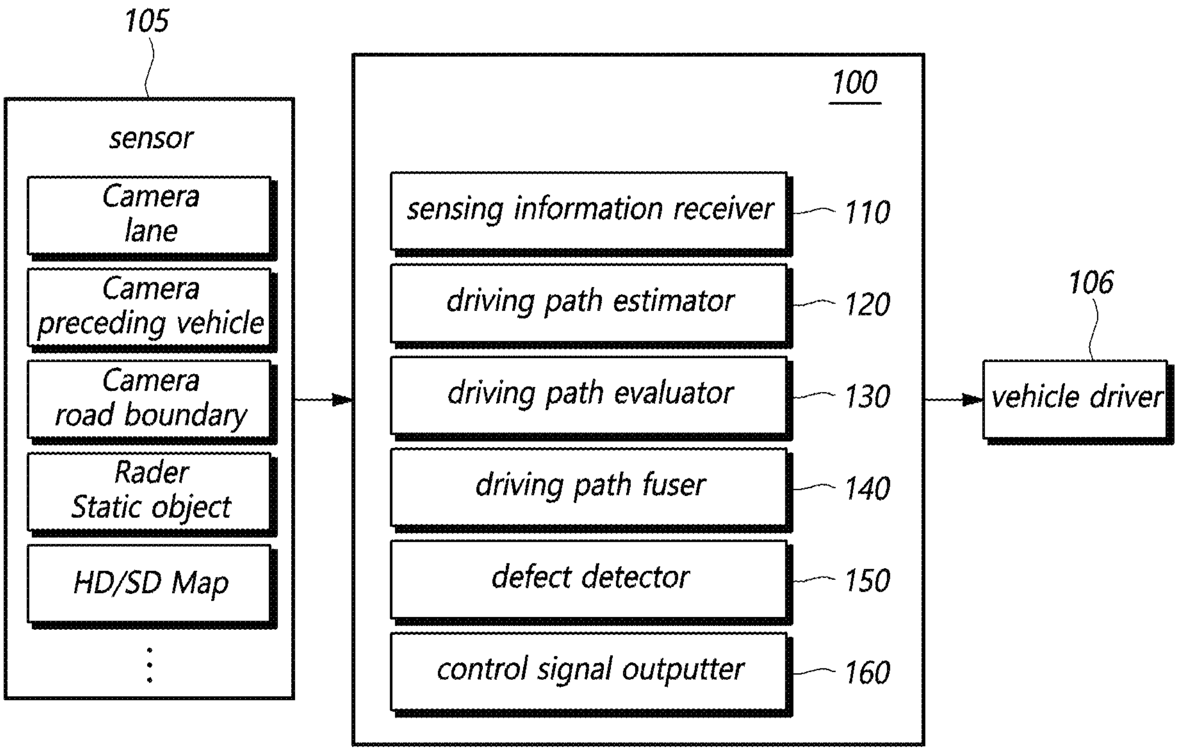
FIG. 1 is a view illustrating a system including a vehicle control device according to an embodiment of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

The sensors described in the disclosure refer to various types of sensors configured in a vehicle, and the number of sensors is not limited. For example, the sensor may include a sensor that detects the outside of the vehicle, such as a camera, a radar, a lidar, and an ultrasonic sensor. Alternatively, the sensor may include a sensor installed inside the vehicle to generate sensing information about the operation of the vehicle, such as a speed sensor, a vehicle motion detection sensor, a wheel speed sensor, an acceleration sensor, and a location sensor.

Meanwhile, the driving path described below refers to a path through which a vehicle is to drive in a function for assisting driving of the vehicle or an autonomous driving function. Accordingly, the estimation of the driving path means estimating a path through which the vehicle is to drive when the vehicle drives without the intervention of the driver and/or while assisting the driver.

For example, various technologies are required to estimate or generate the driving path of the vehicle in the advanced driver-assistance system (ADAS) and the autonomous driving function. As an example, there may be provided a function of generating a driving path to allow a vehicle to drive along a lane without departing from the lane using camera sensors. As another example, there may also be provided a function of controlling driving of a vehicle by generating a driving path so that the vehicle may drive to a destination using location information and precise map information about the vehicle. As another example, there may be provided a function of generating a driving path so that a vehicle drives using a driving trajectory of another vehicle. As another example, there may be provided a function of generating a driving path of a vehicle based on a driving area of the vehicle, such as a curb or a median strip. Further, the driving path estimation algorithm according to the disclosure includes various known algorithms configured to generate a driving path of a vehicle.

The above-described various driving path generation or estimation functions are greatly affected by the state of the sensor configured in the vehicle and the surrounding environment of the vehicle. For example, the function of generating a driving path using a lane may suffer from poor reliability in the section in which the camera sensor is deteriorated or the lane is erased and the recognition rate of the lane is lowered. The function of generating a driving path based on another vehicle may also experience deterioration of reliability of generating a driving path due to a decrease in recognition of another vehicle, abnormal driving of another vehicle, or the like.

As such, the conventional art may experience various issues, such as the occurrence of a risk when generating a driving path by following only the preceding vehicle without using vehicles on the sides or behind, deterioration of function due to a decrease in the recognition rate of sensing information such as lanes, or deterioration of the sense of driving due to shakes of the vehicle according to incontiguous estimated path or abnormal operations.

To address such issues, the disclosure provides an effect of stably minimizing function deterioration by generating an optimal driving path by fusing the paths created by several sensors and the path generation algorithm.

The disclosure may also provide a more accurate driving path by estimating whether a defect defects for the driving path for each algorithm, configured in the vehicle based on the fused driving path.

Hereinafter, the present embodiments are described in more detail with reference to the accompanying drawings.

FIG. 1 is a view illustrating a system including a vehicle control device according to an embodiment of the disclosure.

Referring to FIG. 1, a vehicle control device 100 includes a sensing information receiver 110 receiving sensing information from a sensor configured in a vehicle, a driving path estimator 120 estimating a driving path for each driving path estimation algorithm according to each preconfigured driving path estimation algorithm using the sensing information, a driving path evaluator 130 evaluating reliability of the driving path for each driving path estimation algorithm, a driving path fuser 140 producing a fused driving path based on the driving path for each driving path estimation algorithm and reliability information, a defect detector 150 comparing the fused driving path with the driving path for each driving path estimation algorithm to determine whether a defect occurs, and a control signal outputter 160 outputting a control signal for controlling the behavior of the vehicle according to a final fused driving path reproduced based on a result of determining whether the defect occurs.

For example, various types of sensing signals may be received from the sensor 105 configured in the vehicle of the sensing information receiver 110. The sensor 105 may be configured in various ways according to the type of the vehicle and/or the function of the vehicle, and is not limited thereto. For example, the sensing information may include lane information received from the camera sensor. As another example, the sensing information may include preceding vehicle information received from the camera sensor. As another example, the sensing information may include road boundary information received from the camera sensor. As another example, the sensing information may include object information received from the radar sensor. As another example, the sensing information may include map information received from the navigation system or the like. Further, the sensing information may include various information received from sensors included in the vehicle, such as lateral vehicle information, rear vehicle information, structure information, vehicle location information, and vehicle acceleration information.

The driving path estimator 120 may estimate the driving path of the vehicle according to the preconfigured driving path estimation algorithm using the received sensing information. For example, the driving path estimator 120 may generate a driving path through which the vehicle is to drive according to various types of driving path estimation algorithms.

For example, the driving path estimator 120 may generate a location point for the driving path produced for each driving path estimation algorithm, and estimate the location point as the driving path of the vehicle. The location point may be generated for each time, and various periods or densities thereof may be set. According to the driving path estimation algorithm, the driving path estimator 120 may generate x and y coordinate information about the driving path in which the vehicle is to drive after t time as a location point. The driving path estimator 120 may estimate a line connecting the generated location information as a driving path of the vehicle.

Meanwhile, each preconfigured driving path estimation algorithm may be at least two of a other vehicle-based driving path estimation algorithm for estimating a driving path of the vehicle using other vehicle information detected based on sensing information, a lane-based driving path estimation algorithm for estimating a driving path of the vehicle based on lane information detected based on sensing information, an environment information-based driving path estimation algorithm for estimating a driving path of the vehicle using a road structure detected based on sensing information, and a map data-based driving path estimation algorithm for estimating a driving path of the vehicle based on location information and precise map data information about the vehicle.

For example, the other vehicle-based driving path estimation algorithm may estimate the driving path of the vehicle based on past and future predicted driving paths of at least one other vehicle from among other vehicles located in front, side, and rear of the vehicle. Information about the other vehicles may be received from the sensor 105 and obtained.

As another example, the lane-based driving path estimation algorithm may estimate the driving path so that the vehicle is driven in the lane based on the information about the driving lane of the vehicle received from the camera sensor or the like.

As another example, the environment information-based driving path estimation algorithm may estimate a lane using fixed obstacle information around the road, such as a curb or a median strip, and estimate a driving path so that the vehicle drives in the estimated lane.

As another example, the map data-based driving path estimation algorithm may estimate the driving path so that the vehicle is driven in a predetermined lane according to the precise map data information using the precise map data information and the location information about the vehicle.

Further, the driving path estimation algorithm may be various known algorithms that generate a driving path in which the vehicle is to be driven using sensing information. The driving path estimation algorithm is not limited as long as it is an algorithm capable of generating a driving path of a vehicle using sensing information.

More specifically, the other vehicle-based driving path estimation algorithm may select another vehicle located within a preset transverse distance from the vehicle and within a preset longitudinal time gap with the vehicle, and estimate the driving path of the vehicle based on the driving trajectory of the other vehicle. For example, the other vehicle-based driving path estimation algorithm may estimate a future driving trajectory in a preset time interval based on a past driving trajectory in a preset time interval of the selected other vehicle and speed information about the other vehicle, and estimate the past driving trajectory and the future driving trajectory as driving paths of the vehicle according to location information about the other vehicle.

The lane-based driving path estimation algorithm may estimate the driving path so that the vehicle drives while following the lane based on the lane information. The environment information-based driving path estimation algorithm may generate a virtual lane based on the environment information and estimate a driving path to drive while following the virtual lane. The map data-based driving path estimation algorithm may map the location information about the vehicle to the precise map data information to estimate the driving path so that the vehicle drives while following the lane according to the precise map data information.

The driving path estimator 120 may estimate two or more driving paths based on a preconfigured driving path estimation algorithm. In this case, various driving paths may be generated according to the performance of each algorithm, the performance of sensing information, the reliability of sensing information, and the like. In other words, even in the case of a vehicle driving in the same lane, a difference may occur in a predetermined level of driving path estimation according to the driving path estimation algorithm. Alternatively, in the case of a specific driving path estimation algorithm, the driving path in some sections may not be estimated due to deterioration of sensing information or the like. In other words, continuity of driving path estimation may be deteriorated, or a difference may occur in the estimated driving path for each driving path estimation algorithm.

This may make the vehicle's behavior unstable. Further, when the driving path of the vehicle is estimated using one specific driving path estimation algorithm, it is difficult to estimate the driving path when the corresponding driving path estimation algorithm is not available. In this case, even if the driving path is continuously estimated by another algorithm, a sense of difference may occur in the behavior of the vehicle due to the difference in the driving path for each algorithm. Considering this, in the present embodiment, two or more driving paths are estimated according to each algorithm, evaluated, and fused.

The driving path evaluator 130 may evaluate the reliability of the driving path for each driving path estimation algorithm based on the evaluation of the reliability evaluation factor preset for each driving path estimation algorithm.

A reliability may be assigned to each driving path estimation algorithm. Alternatively, a reliability may be assigned for each driving path produced according to each driving path estimation algorithm. Alternatively, a reliability may be assigned to each location point of the driving path produced according to each driving path estimation algorithm. The reliability evaluation is calculated by various reliability evaluation factors such as the state of the sensor. The following description focuses primarily on an example in which a reliability is evaluated and assigned for each location point, but it may also apply to the autonomous driving various evaluation operations.

For example, the reliability evaluation factor may be set as at least one of distance information between the vehicle and the location point for the driving path produced for each driving path estimation algorithm, distance information between the vehicle and the other vehicle used to produce the driving path, state information about the sensor, or behavior information about the vehicle.

For example, the reliability evaluation factor may be set based on distance information between the vehicle and the location point for the driving path produced by each driving path estimation algorithm. For example, when the distance from the vehicle to the location point is long, reliability of the corresponding location point or the corresponding driving path may be lowered. Conversely, as the distance between the vehicle and the location point decreases, the reliability of the estimated location point or driving path may increase.

As another example, the reliability evaluation factor may evaluate that as the distance of the other vehicle used to estimate the driving path of the vehicle decreases, the reliability increases. Even in this case, reliability may be evaluated for each location point of the estimated driving path.

As another example, reliability evaluation may be performed using state information about the sensor. For example, when the state of the camera sensor is deteriorated, the reliability of the driving path estimated based on the camera sensing information may be evaluated to be low. Even in this case, reliability may be evaluated for each location point of the driving path.

As another example, when the behavior of the vehicle changes rapidly, the reliability of the location point of the driving path estimated at the corresponding time point may be evaluated to be low.

Further, the reliability evaluation factor may be set in various ways. Further, a different reliability evaluation factor may be applied to each driving path estimation algorithm. Alternatively, a reliability evaluation factor commonly applied regardless of each driving path estimation algorithm may be set. Alternatively, the commonly applied reliability evaluation factor and the dedicated reliability evaluation factor set for each algorithm may be mixed and set.

The driving path evaluator 130 may evaluate the reliability of each driving path through the above-described operation. Further, the driving path evaluator 130 may evaluate the reliability of each location point of the driving path.

The driving path fuser 140 may calculate the fused driving path using location points, reliability information, and preset weight information generated based on the driving path for each driving path estimation algorithm. For example, the driving path fuser 140 may fuse driving paths produced according to two or more driving path estimation algorithms. When the two or more driving paths are fused, the driving path fuser 140 may use reliability information evaluated for each driving path or for each location point of each driving path. Further, weight information may be set and applied to prevent a sudden change in the behavior of the vehicle in fusing different driving paths. Further, the weight information may be preset or changed according to the reliability evaluation result. Here, the weight information may be set for each driving path. In other words, it is possible to increase reliability by setting a high weight for a specific driving path in which reliability is evaluated to be high, and setting a low weight for a driving path in which reliability is evaluated to be low.

Alternatively, the weight information may be used as a factor for smoothing the behavior of the vehicle when the driving paths are fused.

For example, the driving path fuser 140 may fuse driving paths for each driving path estimation algorithm based on location points and reliability information using a smoothing spline algorithm. In this case, the driving path fuser 140 may adjust the roughness of the fused driving path using the preset weight information. An embodiment of a specific driving path fusion logic is described below in more detail.

Meanwhile, the defect detector 150 may compare the fused driving path with the driving path for each driving path estimation algorithm to determine whether a defect occurs.

For example, the defect detector 150 may determine whether a defect occurs based on an error value between the location point calculated by the fused driving path and the location point calculated by the driving path for each driving path estimation algorithm.

For example, the defect detector 150 may compare the coordinates of the location point value constituting the fused driving path with the coordinates of the location point value constituting the driving path derived according to each driving path estimation algorithm. The defect detector 150 may compare the two coordinate values to determine that there is a defect in the driving path derived according to the corresponding driving path estimation algorithm when the error of the coordinate value exceeds a preset threshold. Alternatively, the defect detector 150 may determine that a defect is present in the corresponding driving path when the number of location points in which an error of the threshold or more occurs is larger than or equal to a preset reference number.

In other words, the defect detector 150 may determine whether a defect occurs in the driving path for each driving path estimation algorithm based on at least one of whether the error value between the location points is larger than or equal to a predetermined threshold and information about the number of location points having the error value larger than or equal to the predetermined threshold.

Here, the error value may be calculated through a preset algorithm. For example, the error value between the location points may be calculated based on a preset root mean squared error (RMSE) error evaluation algorithm or a negative log-likelihood (NLL) cost evaluation algorithm. Further, various algorithms capable of calculating error values between respective coordinates may be preconfigured in the vehicle control device. There is no limit to the algorithm. Further, the preset threshold and reference number may be set in various ways. For example, at least one of the preset threshold and the reference number may be changed and applied according to the number of driving paths used to calculate the vehicle speed and the fused driving path of the vehicle. In other words, at least one of the threshold and the reference number may be mapped and set according to the vehicle speed, the driving path used to produce the fused driving path, or the like, and the mapped threshold and reference number may be used according to the context.

The control signal outputter 160 may output a control signal for controlling the behavior of the vehicle according to the final fused driving path reproduced based on a result of determining whether a defect occurs. The control signal may be transferred to the vehicle driver 106 to control the behavior of the vehicle.

For example, the final fused driving path may be generated by reproducing the fused driving path only for each driving path estimation algorithm determined not to have a defect based on a result of determining whether a defect occurs.

For example, when no defect occurs, the fused driving path may be used as it is as the final fused driving path. As another example, if it is determined that a defect occurs in any one driving path, the driving path fuser 140 may reproduce the fused driving path using only the driving path in which the defect has not occurred except for the algorithm that has produced the corresponding driving path. The reproduced fused driving path may be used as the final fused driving path.

If it is determined that the number of driving paths to be fused is less than or equal to a predetermined number according to the result of determining whether a defect occurs, the driving path fusion operation may not be performed because reliability of the fused driving paths decreases. In other words, when the fused driving path may not be generated, the vehicle control device may be configured to generate a warning message and allow the behavior of the vehicle to be controlled based on the driving path in which no defect occurs.

Through the above-described operation, the vehicle control device 100 may prevent a decrease in accuracy and reliability that may occur by controlling the behavior of the vehicle based on a result of estimating one driving path. Further, an environmentally robust system may be configured by fusing a plurality of driving paths in various sensing environments. Further, by reflecting the reliability factor, the weight factor, and the like when fusing the driving paths, it is possible to minimize a sense of difference in driving and to more accurately estimate the driving path. Further, it is possible to provide a final fused driving path with high reliability by determining whether a defect occurs in producing each driving path by re-determining the reliability of the fused driving path.

Hereinafter, each operation performed by the above-described vehicle control device is exemplarily described with reference to the drawings. The description of each operation described below is illustrative to help understanding, and the disclosure is not limited to the corresponding drawings and examples.

Figure 2:
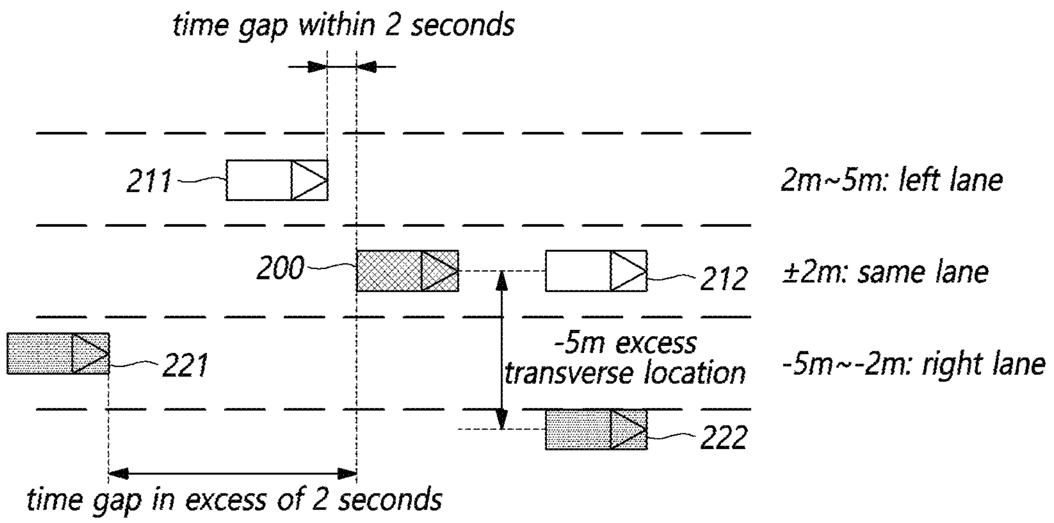
FIG. 2 is a view illustrating an operation of estimating a driving path based on another vehicle, according to an embodiment of the disclosure.

FIG. 2 is a view illustrating an operation of estimating a driving path based on another vehicle, according to an embodiment of the disclosure;

Referring to FIG. 2, the driving path estimator may estimate a driving path in which the vehicle is to drive using sensing information. Driving path estimation may be performed by various algorithms. For example, each preconfigured driving path estimation algorithm may be an other vehicle-based driving path estimation algorithm that estimates a driving path of the vehicle using other vehicle information detected based on sensing information.

The other vehicle-based driving path estimation algorithm may select other vehicles 211 and 212 located within a preset transverse distance from the vehicle 200 and within a preset longitudinal time gap with the vehicle 200, and estimate the driving path of the vehicle 200 based on the driving trajectories of the other vehicles 211 and 212.

For example, the vehicle 200 may obtain surrounding information through a sensor. Information about various vehicles 211, 212, 221, and 222 driving around the vehicle 200 may be obtained through a radar sensor, a camera sensor, a lidar sensor, or the like.

The other vehicle-based driving path estimation algorithm may select a target other vehicle for driving path estimation with respect to the surrounding vehicles 211, 212, 221, and 222 detected through the sensing information.

For example, the other vehicle-based driving path estimation algorithm may select the other vehicles located within a range set to a predetermined distance from the vehicle 200. As another example, the other vehicle-based driving path estimation algorithm may select the other vehicle located within a predetermined time interval range with respect to the vehicle 200. As another example, the other vehicle-based driving path estimation algorithm may select the other vehicle located within a predetermined distance and a predetermined time interval range with respect to the vehicle 200.

The width of lanes may be uniformly determined according to the laws and road standards of individual countries. Considering this, the other vehicle-based driving path estimation algorithm may select the other vehicle based on a predetermined distance with respect to the transverse direction, and select the other vehicle based on a predetermined time interval with respect to the longitudinal direction. In other words, the other vehicle-based driving path estimation algorithm may apply different other vehicle selection criteria in the transverse direction and the longitudinal direction.

Referring to FIG. 2, the vehicle 200 determines that it is the same lane if it is within 2 m from the location of the vehicle 200 to identify whether it is the same lane. Further, the traverse separation distance of 2 to 5 m on the left side with respect to the driving direction of the vehicle 200 is determined as the left lane. Similarly, the traverse separation distance of 2 to 5 m on the right side with respect to the driving direction of the vehicle 200 is determined as the right lane. Further, the space within 2 seconds in front of the vehicle 200 in the longitudinal direction may be set as a predetermined time interval range.

Based on these criteria, the other vehicle-based driving path estimation algorithm may select the other vehicle from the detected target and use the same to estimate the driving path.

For example, the other vehicle-based driving path estimation algorithm determines that it is the same lane as the vehicle 200 when the difference in traverse location between the vehicle 200 and the target is within 2 m. Further, the other vehicle-based driving path estimation algorithm may be determined that it is the left lane or the driving lane when the difference in traverse location between the vehicle 200 and the target exceeds 2 m, and is 5 m or less.

To determine the time interval, the other vehicle-based driving path estimation algorithm may determine whether the time gap between the vehicle 200 and the detected target is in a longitudinal-direction state within 2 seconds. The time gap may be calculated using the distance between the vehicle and the target and the relative speed.

If the other vehicle is selected through the algorithm described above, it may be selected as follows.

The other vehicle-based driving path estimation algorithm may select the target 211, 212, and 221 located in the same lane as the vehicle 200 and left and right lanes as other vehicle candidates based on a predetermined distance range set with respect to the vehicle 200. Among them, the vehicle 221 may be excluded from the other vehicle candidates because the time interval with the vehicle 200 exceeds 2 seconds. Similarly, the vehicle 222 may be excluded from the other vehicle candidates as it exceeds the transverse separation distance set to 5 m with respect to the vehicle 200. Accordingly, the other vehicles selected with respect to the vehicle 200 may be the vehicles 211 and 212 located at a time interval within 2 seconds and set as a transverse separation distance set as 5 m. The distance and time criteria may be applied simultaneously or applied sequentially.

The above-described time and distance are illustrative and may vary depending on settings, or may be dynamically changed by, e.g., a curved driving path or an inclination using map information.

Figure 3:
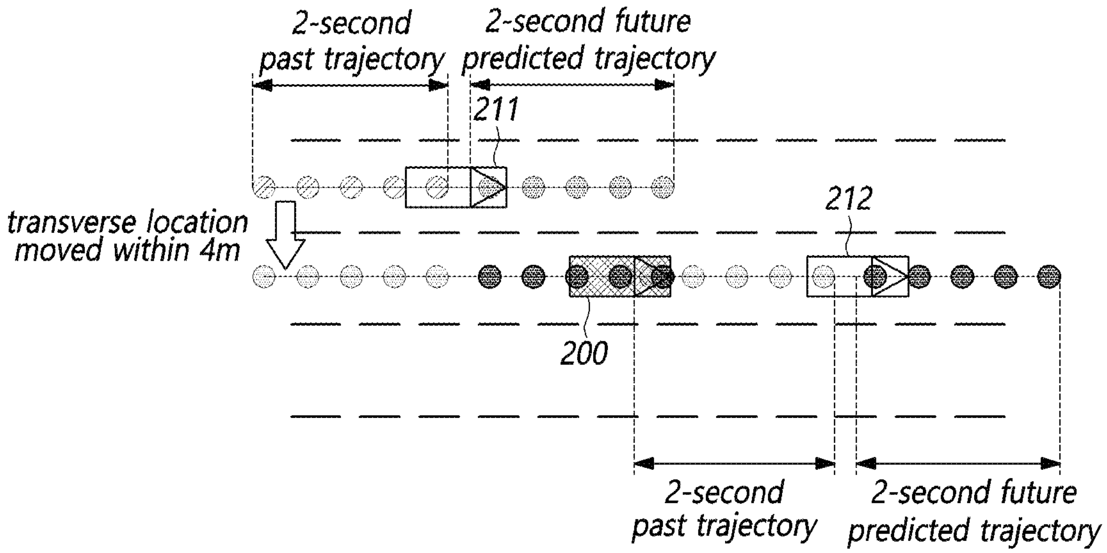
FIG. 3 is a view illustrating an operation of estimating a driving path based on another vehicle, according to an embodiment of the disclosure.

FIG. 3 is a view illustrating an operation of estimating a driving path based on another vehicle, according to an embodiment of the disclosure;

The other vehicle-based driving path estimation algorithm estimates a future driving trajectory in a preset time interval based on a past driving trajectory in a preset time interval and speed information about the other vehicles with respect to the selected other vehicles 211 and 212.

Referring to FIG. 3, the vehicle 200 may select other vehicles 211 and 212. The method described with reference to FIG. 2 may be applied to select the other vehicles 211 and 212, but is not limited thereto.

The other vehicle-based driving path estimation algorithm calculates past driving trajectories and future driving trajectories of the other vehicles 211 and 212. For example, a future predicted trajectory after 2 seconds may be calculated when driving at the same speed as the past trajectory before 2 seconds of the vehicle 211. In the same way, the trajectory of the past 2 seconds and the trajectory of the future 2 seconds may be calculated for the vehicle 212.

For example, the other vehicle-based driving path estimation algorithm predicts a driving path of the future two seconds based on the driving path of the past two seconds and the same speed (Vx, Vy) of the other vehicles 211 and 212. The driving path of the vehicle may be estimated based on the 4-second path thus calculated for each of the other vehicles 211 and 212.

Thereafter, the other vehicle-based driving path estimation algorithm estimates the past driving trajectory and the future driving trajectory as the driving path of the vehicle according to the location information about the other vehicles 211 and 212.

For example, when the transverse distance at which the vehicle 211 is spaced apart from the vehicle 200 is calculated as 4 m, the past trajectory and future trajectory of the vehicle 211 are 4 m moved to the inside of the lane of the vehicle 200. Since the vehicle 212 is present in the same lane as the vehicle 200, the transverse movement may be omitted. Alternatively, even when the vehicle 212 and the vehicle 200 are in the same lane, if there is a transverse separation distance of a predetermined level or more, the vehicle 212 and the vehicle 200 may be moved in the transverse direction by the corresponding separation distance. Each trajectory may be expressed as a location point according to a preset interval.

Meanwhile, the time and distance are exemplary and may be changed according to settings, or may be dynamically changed by a curved driving path or an inclination using map information.

The other vehicle-based driving path estimation algorithm may estimate the driving path of the vehicle 200 by merging the calculated past and future predicted trajectories of the other vehicles 211 and 212.

Accordingly, it is possible to produce the driving path of the host vehicle using the target vehicle located in the same lane as well as another lane. However, when there is no surrounding vehicle or there is no vehicle that meets the selection condition, it may be difficult to continue estimating the driving path if only the other vehicle-based driving path estimation algorithm is used. To solve this problem, various algorithms and other fusing technologies are provided for reliability evaluation of the disclosure.

Figure 4:
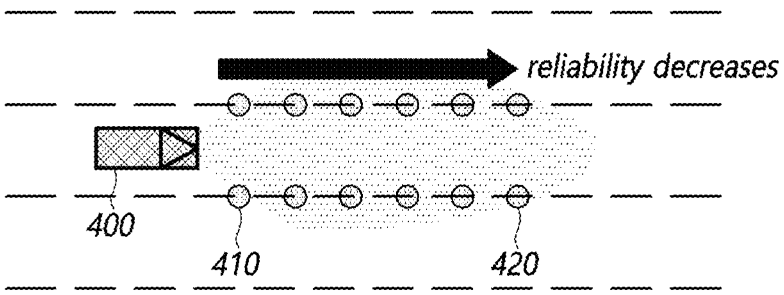
FIG. 4 is a view illustrating reliability evaluation for a driving path estimated based on a lane, according to an embodiment of the disclosure.

FIG. 4 is a view illustrating reliability evaluation for a driving path estimated based on a lane, according to an embodiment of the disclosure;

Referring to FIG. 4, the lane-based driving path estimation algorithm may estimate the driving path so that the vehicle 400 drives while following the lane based on the lane information. For example, the lane-based driving path estimation algorithm may estimate the driving path so that the vehicle 400 drives, located in the middle of the lane and is driven using the lane information recognized through the sensing information. However, there is a possibility that the reliability of the lane information may decrease as the distance from the vehicle 400 increases. For example, when the lane information is calculated as a location point, the reliability of the location point 420 decreases compared to the location point 410.

This may be present in various algorithms such as an environment information-based driving path estimation algorithm, a map data-based driving path estimation algorithm, and an other vehicle-based driving path estimation algorithm. Factors that decrease reliability may also appear as various factors such as sensor deterioration and decreased recognition.

For example, the environment information-based driving path estimation algorithm generates a virtual lane based on the environment information and estimates the driving path to drive while following the virtual lane. Even in the driving path estimated by the environment information-based driving path estimation algorithm, reliability may decrease as the separation distance from the vehicle increases. Or, reliability may decrease due to the surrounding environment, such as weather when it is difficult to collect environment information.

The map data-based driving path estimation algorithm may map the location information about the vehicle to the precise map data information to estimate the driving path so that the vehicle drives while following the lane according to the precise map data information. Even in this case, the reliability may rapidly decrease according to a decrease in sensing performance for location information and a driving environment such as a tunnel.

Accordingly, the driving path evaluator may evaluate the reliability of the driving path for each driving path estimation algorithm based on the evaluation of the reliability evaluation factor preset for each driving path estimation algorithm. The reliability evaluation factor may be set as at least one of distance information between the vehicle and the location point for the driving path produced for each driving path estimation algorithm, distance information between the vehicle and the other vehicle used to produce the driving path, state information about the sensor, or behavior information about the vehicle.

For example, a location point set at a location far from the vehicle may be evaluated to have lower reliability than a location point set at a relatively close location. Further, based on the sensing information contributing to the generation of the location point, the reliability of the location point generated using the target at the location far from the vehicle may be evaluated to be low. Further, the reliability of the generated location point may be evaluated by reflecting the sensor state information according to the occurrence of an abnormality in the sensor. Further, a sudden change in the location of the vehicle may cause a decrease in lane recognition, so that the reliability of the lane recognized at the corresponding time point or the location point generated based on the environment information may be evaluated to be low.

Figure 5:
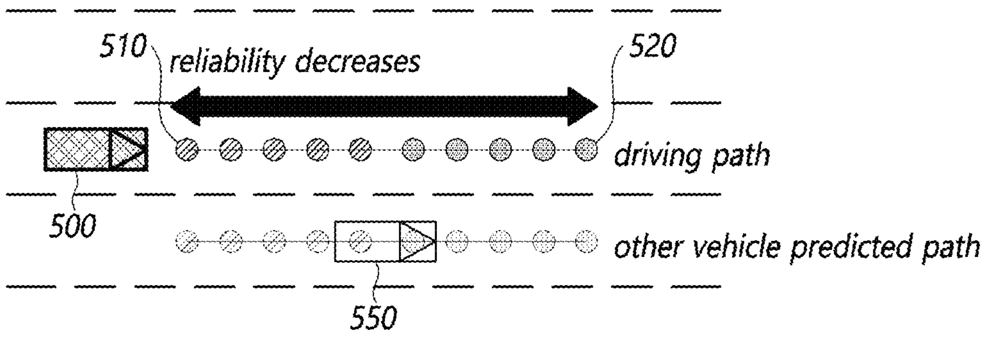
FIG. 5 is a view illustrating reliability evaluation for a driving path estimated based on another vehicle, according to an embodiment of the disclosure.

FIG. 5 is a view illustrating reliability evaluation for a driving path estimated based on another vehicle, according to an embodiment of the disclosure;

Referring to FIG. 5, the vehicle 500 may generate a plurality of location points, e.g., 510 and 520 through the other vehicle-based driving path estimation algorithm to estimate a driving path. Here, the other vehicle 550 is spaced apart from the vehicle 500 in the transverse direction and the longitudinal direction by a predetermined distance. As described above, the predicted path of the other vehicle 500 is estimated using the past trajectory of the other vehicle 500 before a predetermined time and the future predicted trajectory predicted after a predetermined time. The predicted path of the other vehicle is estimated to be the driving path of the vehicle 500 through the transverse movement of a predetermined distance.

In this case, as the distance of the location point generated with respect to the location of the other vehicle 550 increases, the reliability is evaluated to be lower. In other words, the reliability of the location point 510 and the location point 520 may be evaluated to be low. This is because the reliability of the future trajectory or the trajectory of a certain range of past based on the current sensing information is lower than the current reliability.

Or, when the location point 510 is generated by tracking the past trajectory of the other vehicle 550 in real time, reliability may be set to decrease toward the location point 520. In other words, the reliability of each location point may be variously determined according to a preset criterion.

Figure 6:
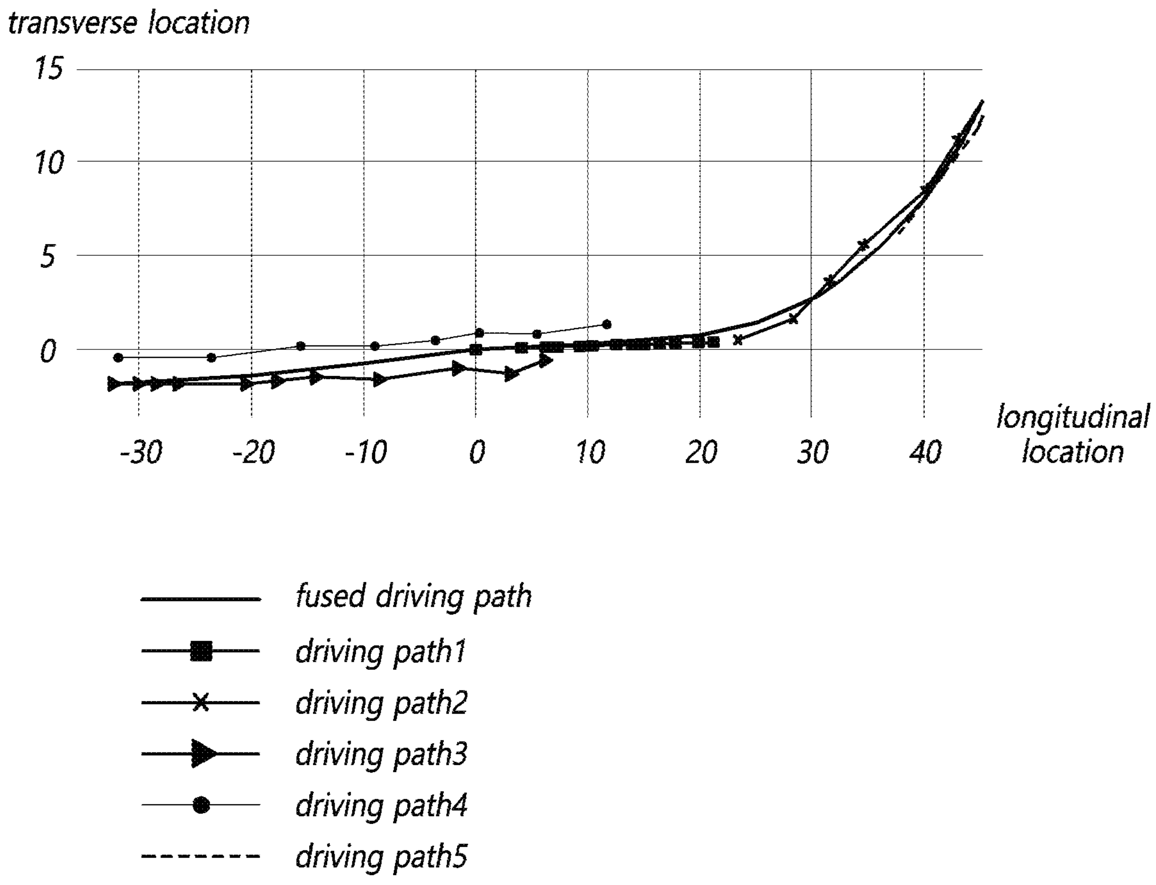
FIG. 6 is a view illustrating an example of estimating a fused driving path according to an embodiment.

FIG. 6 is a view illustrating an example of estimating a fused driving path according to an embodiment.

Referring to FIG. 6, the driving path fuser may produce the fused driving path using location points, reliability information, and preset weight information generated based on the driving path for each driving path estimation algorithm.

For example, the driving path fuser fuses driving paths for each driving path estimation algorithm based on location points and reliability information using a smoothing spline algorithm. Further, the driving path fuser may adjust the roughness of the fused driving path using the preset weight information.

In other words, the driving paths 1 to 5 may be produced through the various algorithms described above. Each driving path may be calculated as a location point, and the driving paths calculated according to the algorithms or sensing information may have different ranges. Alternatively, a specific driving path may be produced as partially cut off. The driving path fuser produces a fused driving path by fusing the driving paths 1 to 5 for each location point based on a preset algorithm. The vehicle performs driving through the driving path set below using the location point of the fused driving path.

However, when simple fusion is performed while a plurality of driving paths are fused, the behavior of the vehicle may be roughly operated due to the separation between the location points. In other words, the vehicle may abruptly move to follow, e.g., a spike location point. To prevent this, both stability and ride comfort may be provided by adjusting the weight by applying a cubic smoothing spline matrix or the like.

For example, the driving paths may be fused using a cubic smoothing spline. The driving path fuser generates a fused driving path by generating a smoothing spline that minimizes Equation 1 below when the fused driving path is set to f (x).

$$p\sum_{i=1}^{N}\left[\frac{y_i - f(x_i)}{\delta y_i}\right]^2 + (1-p)\int_{x_1}^{x_N}\left(f^{(2)}(t)\right)^2 dt \qquad \text{[Equation 1]}$$

In Equation 1, the first term is a factor for generating a spline to be close to each path location point, and the second term is a factor for generating a smooth spline. The nodes of each spline are applied as the location point ($x_i y_i$) and the reliability ($1/\delta y_i$).

p means the weight preset as a smoothing parameter in range [0, 1]. The closer to 1 p is, the spline closer to the estimated driving path point is generated and, the closer to 0 p is, the smoother spline is generated. Since the vehicle drives while following the generated spline, smoother driving is possible compared to location point tracking.

Figure 7:
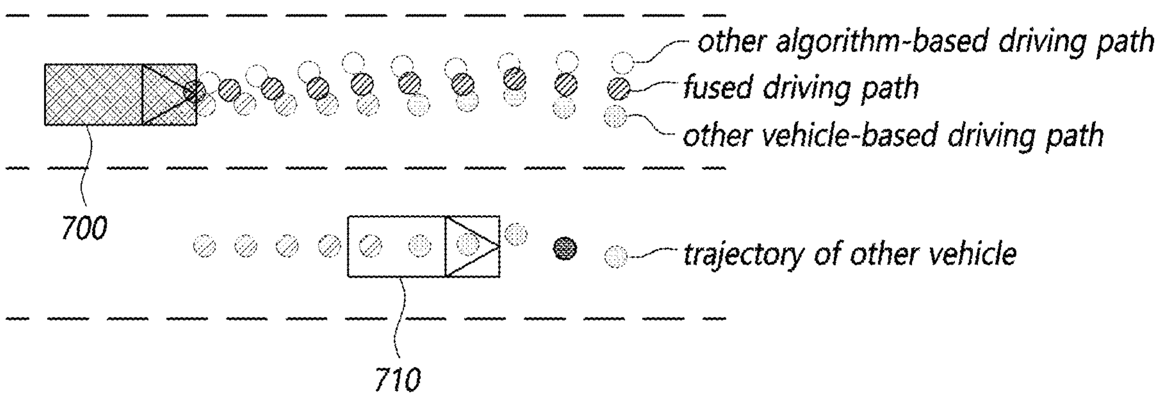
FIG. 7 is a view illustrating a location point of a vehicle according to a fused driving path according to an embodiment.

FIG. 7 is a view illustrating a location point of a vehicle according to a fused driving path according to an embodiment.

Referring to FIG. 7, the vehicle control device may estimate the trajectory of the other vehicle based on the other vehicle 710 through the other vehicle-based driving path estimation algorithm, and may generate an other vehicle-based driving path by moving the trajectory to the lane of the vehicle 700. The driving path estimated using another algorithm may also be represented as a location point in the lane of the vehicle 700. The vehicle control device generates a fused driving path by fusing a plurality of estimated driving paths into one through the operation of the driving path fuser described above. The fused driving path is generated by applying the location point, the reliability assigned to the location point, and the weight value for smooth driving.

Provided are a vehicle control method and device for producing a driving path of a vehicle using a plurality of estimated driving paths through the above-described operations. Accordingly, the same algorithm may be used to quickly apply to vehicles under various conditions, and a driving path may be estimated even when there is no vehicle ahead. Further, it is possible to generate a path in a distance longer than the conventional camera-based recognition distance, and it is possible to quickly recognize risk and set a speed plan. In other words, the camera recognition distance is about 80 m, but the radar recognition distance is about 250 m, and it is possible to estimate a driving path of a long distance through fusion of the location points. Further, there is an advantage that it may be used even in an environment where there is no lane or an unclear lane.

Meanwhile, the defect detector may compare the fused driving path with the driving path for each driving path estimation algorithm to determine whether a defect occurs.

For example, to compare the fused driving path with the driving path for each driving path estimation algorithm, an error value between the location points may be produced. In other words, the defect detector may determine whether a defect occurs based on an error value between the location point produced by the fused driving path and the location point produced by the driving path for each driving path estimation algorithm.

The error value between the location points may be produced according to various algorithms. Hereinafter, two algorithms are exemplarily described, but the disclosure is not limited thereto.

For example, the error value between the location points may be calculated according to a preset root mean squared error (RMSE) evaluation algorithm.

Figure 8:
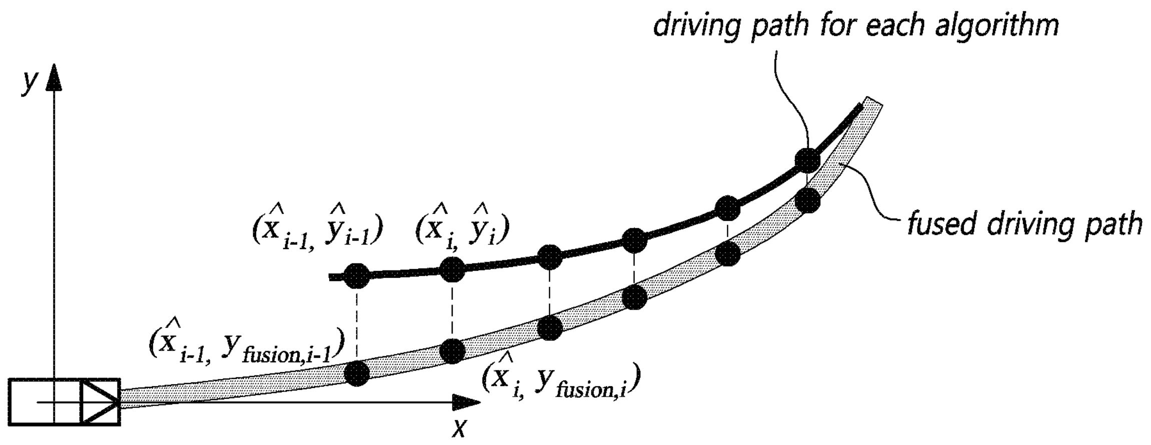
FIG. 8 is a view illustrating a defect detection operation according to an embodiment.

FIG. 8 is a view illustrating a defect detection operation according to an embodiment.

Referring to FIG. 8, it may be determined whether a defect occurs by determining whether the average value of the location point error between the fused driving path and the driving path for each driving path estimation algorithm is larger than or equal to a predetermined threshold.

When each location point of the driving path for each driving path estimation algorithm is $\hat{x}_i,\hat{y}_i$, $\hat{x}_i,\hat{y}_i$ may be projected in the x-axis direction of the fused driving path, producing the point $x_{fusion,i}$ $y_{fusion,i}$ of the fused driving path. Here, $x_{fusion,i}$ is $\hat{x}_i$.

Thereafter, the root mean squared error (RMSE) of the location point values $\hat{y}_i$ and $y_{fusion,i}$ of the driving paths for each driving path estimation algorithm may be derived according to Equation 2 below.

$$RMSE = \sqrt{\sum_{i=1}^{n} \frac{(\hat{y}_i - y_{fusion,i})^2}{n}} \quad \text{[Equation 2]}$$

When the derived root mean squared error (RMSE) value is larger than or equal to a preset threshold, it may be determined that a defect is present in the corresponding driving path.

Although described above based on the x-axis value, the disclosure may be equally applied to measuring the root mean squared error (RMSE) of the x-coordinate value by projecting each location point on the y-axis.

As another example, the error value between the location points may be calculated based on a native log-likelihood (NLL) cost evaluation algorithm.

Figure 9:
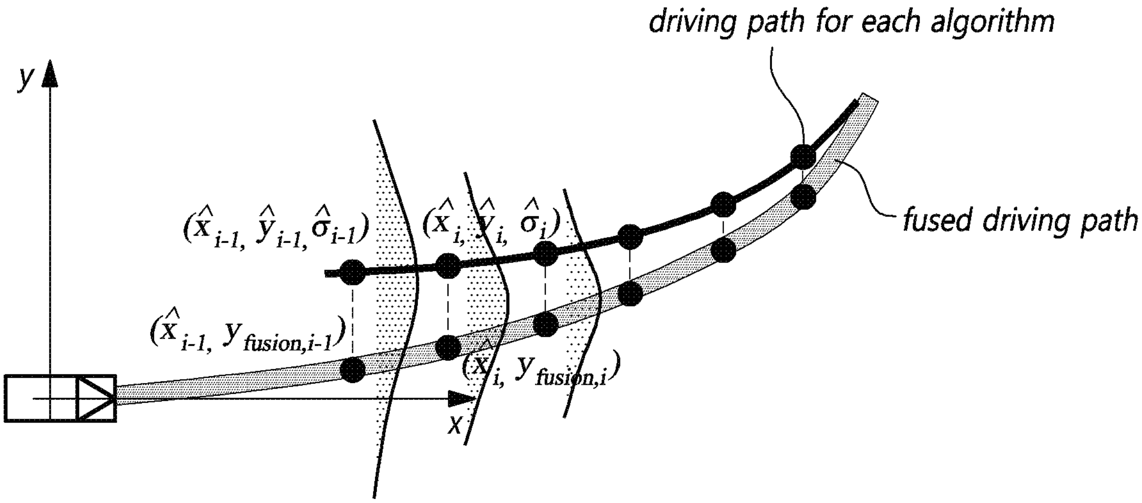
FIG. 9 is a view illustrating a defect detection operation according to another embodiment.

FIG. 9 is a view illustrating a defect detection operation according to another embodiment.

Referring to FIG. 9, it may be determined whether there is a defect according to the NLL cost evaluation of the fused driving path and the driving path for each driving path estimation algorithm. In other words, it may be determined whether there is a defect by how much the probability of the location point of the driving path for each driving path estimation algorithm does not match the fused driving path.

For example, when each location point of the driving path for each driving path estimation algorithm is $\hat{x}_i,\hat{y}_i,\hat{\sigma}_i$, $\hat{x}_i,\hat{y}_i,\hat{\sigma}_i$ may be projected in the x-axis direction of the fused driving path, producing the point $x_{fusion,i}y_{fusion,i}$ of the fused driving path. Here, $x_{fusion,i}$ is $\hat{x}_i$.

Thereafter, the NLL error of $\hat{y}_i$ which is the location point value of each driving path and the point $y_{fusion,i}$ of the fused driving path at the corresponding location x may be derived according to Equation 3.

$$\text{Likelihood} = \prod_{i=1}^{N} P_{N(\hat{y}_i,\hat{\sigma}_i)}(y_{fusion,i}) \quad \text{[Equation 3]}$$

$$NLL = -\log(\text{Likelihood}) = -\sum_{i=1}^{n} \log P_{N(\hat{y}_i,\hat{\sigma}_i)}(y_{fusion,i})$$

The NLL error may be calculated through the following operation.

The Gaussian distribution is generated with the uncertainty (1/reliability) of the location point of the driving path for each driving path estimation algorithm. The probability (probability density) in which the location point of the fused driving path matches the Gaussian distribution is calculated. The probability of matching for all the location points is calculated, and is scaled to a negative log.

When the derived NLL error value for each driving path estimation algorithm is larger than or equal to a preset threshold, it may be determined that there is a defect.

As another example, the location point of the driving path for each driving path estimation algorithm may be projected on the x-axis or y-axis of the fused driving path. Thereafter, it is determined that the distance difference between the location points on the y-axis or x-axis is larger than or equal to a preset threshold. When there are N or more location points having a distance difference of the threshold or more, it may be determined that the corresponding driving path has a defect.

Through the above operation, it is possible to determine whether the driving path producing algorithm has a defect by comparing the driving path and the fused driving path.

The driving path fuser may produce a final fused driving path by fusing the remaining driving paths except for the defective driving path based on a result of determining whether a defect occurs.

The control signal outputter may output a control signal for controlling the behavior of the vehicle according to the reproduced final fused driving path.

Hereinafter, the above-described operations are briefly described once again in time series. Each of the operations described above may be performed by each of the following steps, and a specific step may be added or merged if necessary.

Figure 10:
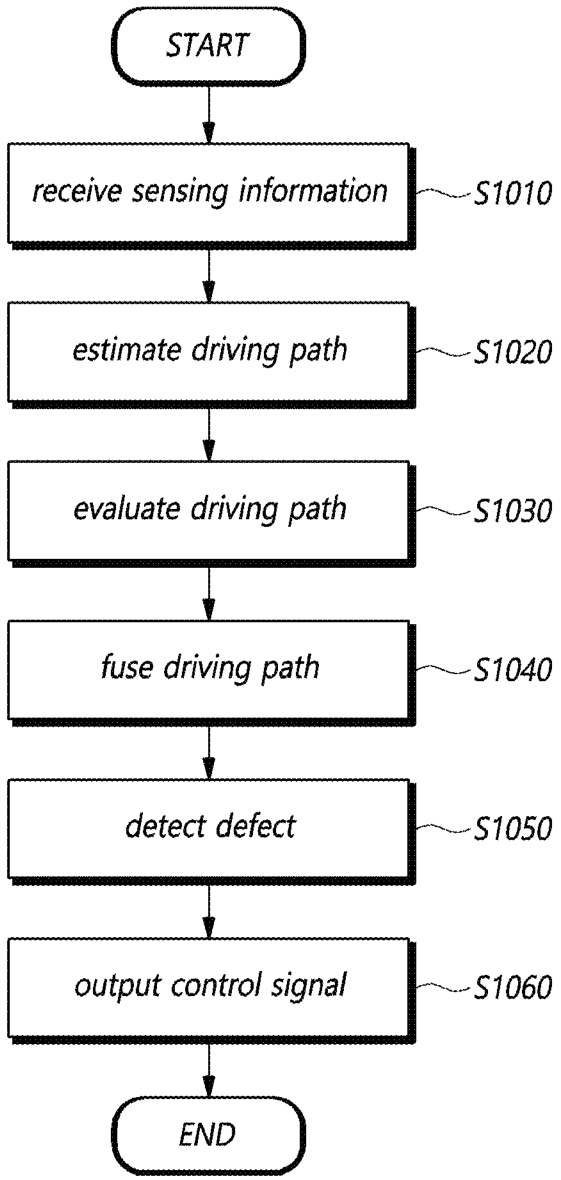
FIG. 10 is a view illustrating a vehicle control method according to an embodiment.

FIG. 10 is a view illustrating a vehicle control method according to an embodiment.

Referring to FIG. 10, the vehicle control method may include a sensing information reception step for receiving sensing information from a sensor configured in the vehicle (S1010).

In the sensing information reception step, the sensing information is received from various sensors configured in the vehicle. Each sensing information may vary depending on the type of vehicle, and sensing information required by the driving path estimation algorithm may vary. Accordingly, in the sensing information reception step, only sensing information required for each driving path estimation algorithm may be received.

The vehicle control method may include a driving path estimation step of estimating a driving path for each driving path estimation algorithm according to each preconfigured driving path estimation algorithm using the sensing information (S1020).

For example, the driving path estimation step may generate a location point for the driving path produced for each driving path estimation algorithm and estimate the location point as the driving path of the vehicle.

Each preconfigured driving path estimation algorithm may be at least two of a other vehicle-based driving path estimation algorithm for estimating a driving path of the vehicle using other vehicle information detected based on sensing information, a lane-based driving path estimation algorithm for estimating a driving path of the vehicle based on lane information detected based on sensing information, an environment information-based driving path estimation algorithm for estimating a driving path of the vehicle using a road structure detected based on sensing information, and a map data-based driving path estimation algorithm for estimating a driving path of the vehicle based on location information and precise map data information about the vehicle.

As an example, the other vehicle-based driving path estimation algorithm may select another vehicle located within a preset transverse distance from the vehicle and within a preset longitudinal time gap with the vehicle, and estimate the driving path of the vehicle based on the driving trajectory of the other vehicle. Further, the other vehicle-based driving path estimation algorithm may estimate a future driving trajectory in a preset time interval based on a past driving trajectory in a preset time interval and speed information about the other vehicles with respect to the selected other vehicles. The other vehicle-based driving path estimation algorithm may estimate the past driving trajectory and the future driving trajectory as the driving path of the vehicle according to the location information about the other vehicles.

The vehicle control method may include a driving path evaluation step of evaluating a reliability of the driving path for each driving path estimation algorithm (S1030).

For example, the driving path evaluation step may evaluate the reliability of the driving path for each driving path estimation algorithm based on the evaluation of the reliability evaluation factor preset for each driving path estimation algorithm.

The reliability evaluation factor may be set as at least one of distance information between the vehicle and the location point for the driving path produced for each driving path estimation algorithm, distance information between the vehicle and the other vehicle used to produce the driving path, state information about the sensor, or behavior information about the vehicle.

The vehicle control method may include a driving path fusion step of producing a fused driving path based on the driving path and reliability information for each driving path estimation algorithm (S1040).

For example, the driving path fusion step may calculate the fused driving path using location points, reliability information, and preset weight information generated based on the driving path for each driving path estimation algorithm.

For example, the driving path fusion step may fuse the driving path for each driving path estimation algorithm based on the location point and the reliability information using a smoothing spline algorithm, and adjust a roughness of the fused driving path using the preset weight information.

The vehicle control method may include a defect detection step of determining whether a defect occurs by comparing the fused driving path with the driving path for each driving path estimation algorithm (S1050).

The defect detection step may compare the fused driving path with the driving path for each driving path estimation algorithm to determine whether a defect occurs.

For example, the defect detection step may determine whether a defect occurs based on an error value between the location point calculated by the fused driving path and the location point calculated by the driving path for each driving path estimation algorithm.

For example, the defect detection step may compare the coordinates of the location point value constituting the fused driving path with the coordinates of the location point value constituting the driving path derived according to each driving path estimation algorithm. The defect detection step may compare the two coordinate values to determine that there is a defect in the driving path derived according to the corresponding driving path estimation algorithm when the error of the coordinate value exceeds a preset threshold. Alternatively, the defect detection step may determine that a defect is present in the corresponding driving path when the number of location points in which an error of the threshold or more occurs is larger than or equal to a preset reference number.

In other words, the defect detection step may determine whether a defect occurs in the driving path for each driving path estimation algorithm based on at least one of whether the error value between the location points is larger than or equal to a predetermined threshold and information about the number of location points having the error value larger than or equal to the predetermined threshold.

Here, the error value may be calculated through a preset algorithm. For example, the error value between the location points may be calculated based on a preset root mean squared error (RMSE) error evaluation algorithm or a negative log-likelihood (NLL) cost evaluation algorithm. Further, various algorithms capable of calculating error values between respective coordinates may be preconfigured in the vehicle control device. There is no limit to the algorithm. Further, the preset threshold and reference number may be set in various ways. For example, at least one of the preset threshold and the reference number may be changed and applied according to the number of driving paths used to calculate the vehicle speed and the fused driving path of the vehicle. In other words, at least one of the threshold and the reference number may be mapped and set according to the vehicle speed, the driving path used to produce the fused driving path, or the like, and the mapped threshold and reference number may be used according to the context.

The vehicle control method may include a control signal outputting step of outputting a control signal for controlling the behavior of the vehicle according to a final fused driving path reproduced based on a result of determining whether a defect occurs (S1060).

For example, the control signal output step may output a control signal for controlling the behavior of the vehicle according to the final fused driving path reproduced based on a result of determining whether a defect occurs. The control signal may be transferred to the vehicle driver to control the behavior of the vehicle.

For example, the final fused driving path may be generated by reproducing the fused driving path only for each driving path estimation algorithm determined not to have a defect based on a result of determining whether a defect occurs.

For example, when no defect occurs, the fused driving path may be used as it is as the final fused driving path. As another example, if it is determined that a defect occurs in any one driving path, the driving path fusion step may reproduce the fused driving path using only the driving path in which the defect has not occurred except for the algorithm that has produced the corresponding driving path. The reproduced fused driving path may be used as the final fused driving path.

If it is determined that the number of driving paths to be fused is less than or equal to a predetermined number according to the result of determining whether a defect occurs, the driving path fusion operation may not be performed because reliability of the fused driving paths decreases. In other words, when the fused driving path may not be generated, the vehicle control device may be configured to generate a warning message and allow the behavior of the vehicle to be controlled based on the driving path in which no defect occurs.

Further, the vehicle control method may perform an operation necessary for the above-described operation of the disclosure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle configured to perform operations comprising:
- receiving sensing information from a sensor configured in the vehicle;
- estimating a driving path for each preconfigured driving path estimation algorithm according to each driving path estimation algorithm using the sensing information;
- evaluating a reliability of the driving path for each driving path estimation algorithm;
- producing a fused driving path based on the driving path for each driving path estimation algorithm and the reliability information;
- determining whether a defect occurs by comparing the fused driving path with the driving path for each driving path estimation algorithm; and
- outputting a control signal for controlling a behavior of the vehicle according to a final fused driving path reproduced based on a result of determining whether the defect occurs.

2. The vehicle of claim 1, wherein the estimating the driving path generates a location point for the driving path produced for each driving path estimation algorithm, and estimates the location point as a driving path of the vehicle.

3. The vehicle of claim 1, wherein each preconfigured driving path estimation algorithm includes at least two of an other vehicle-based driving path estimation algorithm that estimates a driving path of the vehicle using other vehicle information detected based on the sensing information, a lane-based driving path estimation algorithm that estimates the driving path of the vehicle based on lane information detected based on the sensing information, an environment information-based driving path estimation algorithm that estimates the driving path of the vehicle using a road structure detected based on the sensing information, and a map data-based driving path estimation algorithm that estimates the driving path of the vehicle based on location information about the vehicle and precise map data information.

4. The vehicle control device of claim 3, wherein the other vehicle-based driving path estimation algorithm estimates the driving path of the vehicle based on a driving trajectory of the other vehicle by selecting the other vehicle located within a preset transverse distance from the vehicle and within a preset longitudinal time gap with the vehicle.

5. The vehicle of claim 4, wherein the other vehicle-based driving path estimation algorithm estimates a future driving trajectory in a preset time interval based on a past driving trajectory in a preset time interval of the selected other vehicle and speed information about the other vehicle, and estimates the past driving trajectory and the future driving trajectory as the driving path of the vehicle according to location information about the other vehicle.

6. The vehicle of claim 1, wherein the evaluating the reliability of the driving path evaluates a reliability of the driving path for each driving path estimation algorithm based on an evaluation of a reliability evaluation factor preset for each driving path estimation algorithm.

7. The vehicle of claim 6, wherein the reliability evaluation factor is set to at least one of distance information between the vehicle and a location point for the driving path produced for each driving path estimation algorithm, distance information between the vehicle and the other vehicle used to produce the driving path, state information about the sensor, or behavior information about the vehicle.

8. The vehicle of claim 1, wherein the producing the fused driving path produces the fused driving path using a location point generated based on the driving path for each driving path estimation algorithm, the reliability information, and preset weight information.

9. The vehicle of claim 8, wherein the producing the fused driving path fuses the driving path for each driving path estimation algorithm based on the location point and the reliability information using a smoothing spline algorithm, and adjusts a roughness of the fused driving path using the preset weight information.

10. The vehicle of claim 1, wherein the defect detector determines whether the defect occurs based on an error value between a location point produced by the fused driving path and a location point produced by the driving path for each driving path estimation algorithm.

11. The vehicle of claim 10, wherein the error value between the location points is produced based on a preset root mean squared error (RMSE) evaluation algorithm or a native log-likelihood (NLL) cost evaluation algorithm.

12. The vehicle of claim 10, wherein the determining whether the defect occurs determines whether the defect occurs in the driving path for each driving path estimation algorithm based on at least one of whether the error value between the location points is larger than or equal to a preset threshold and information about the number of the location points having the error value larger than or equal to the preset threshold.

13. The vehicle of claim 1, wherein the final fused driving path is generated by reproducing the fused driving path only for the driving path for each driving path estimation algorithm that is determined not to have a defect based on a result of determining whether the defect occurs.

14. A vehicle control method, comprising:

receiving a sensing information from a sensor configured in a vehicle;

estimating a driving path for each driving path estimation algorithm according to each preconfigured driving path estimation algorithm using the sensing information;

evaluating a reliability of the driving path for each driving path estimation algorithm;

producing a fused driving path based on the driving path for each driving path estimation algorithm and the reliability information;

determining whether a defect occurs by comparing the fused driving path with the driving path for each driving path estimation algorithm; and outputting a control signal for controlling a behavior of the vehicle according to a final fused driving path reproduced based on a result of determining whether the defect occurs.

15. The vehicle control method of claim 14, wherein the estimating the driving path generates a location point for the driving path produced for each driving path estimation algorithm, and estimates the location point as a driving path of the vehicle.

16. The vehicle control method of claim 14, wherein each preconfigured driving path estimation algorithm includes at least two of an other vehicle-based driving path estimation algorithm that estimates a driving path of the vehicle using other vehicle information detected based on the sensing information, a lane-based driving path estimation algorithm that estimates the driving path of the vehicle based on lane information detected based on the sensing information, an environment information-based driving path estimation algorithm that estimates the driving path of the vehicle using a road structure detected based on the sensing information, and a map data-based driving path estimation algorithm that estimates the driving path of the vehicle based on location information about the vehicle and precise map data information.

17. The vehicle control method of claim 14, wherein the evaluating the reliability of the driving path evaluates a reliability of the driving path for each driving path estimation algorithm based on an evaluation of a reliability evaluation factor preset for each driving path estimation algorithm.

18. The vehicle control method of claim 14, wherein the producing the fused driving path produces the fused driving path using a location point generated based on the driving path for each driving path estimation algorithm, the reliability information, and preset weight information.

19. The vehicle control method of claim 14, wherein the determining whether the defect occurs determines whether the defect occurs based on an error value between a location point produced by the fused driving path and a location point produced by the driving path for each driving path estimation algorithm.

20. The vehicle control method of claim 19, wherein the determining whether the defect occurs determines whether the defect occurs in the driving path for each driving path estimation algorithm based on at least one of whether the error value between the location points is larger than or equal to a preset threshold and information about the number of the location points having the error value larger than or equal to the preset threshold.

* * * * *